Dec. 2, 1952  J. DUNGLER  2,619,703

STRETCHER DEVICE FOR FABRICS

Filed Jan. 14, 1950

INVENTOR.
JULIEN DUNGLER
BY
Leon M. Strauss

Patented Dec. 2, 1952

2,619,703

UNITED STATES PATENT OFFICE 2,619,703

STRETCHER DEVICE FOR FABRICS

Julien Dungler, Basel, Switzerland

Application January 14, 1950, Serial No. 138,683
In France April 13, 1949

6 Claims. (Cl. 26—63)

The present invention relates to stretcher devices for use in the textile industry for widening or stretching of fabrics.

Heretofore, devices for stretching fabrics usually were equipped with one or more cylindrical beams or carriers on curved spindles upon which were journaled, either by means of slidable yieldable bearings or ball bearings a certain number of individually mounted rollers so that their plane of symmetry with respect to their axes extends perpendicular to the axis of the curved spindle. These known devices have a great number of drawbacks. The bearings are inaccessible without completely disassembling the device, which seriously interferes with adequate lubrication. Another disadvantage is that the rollers are made of metal, which cause a considerable amount of inertia which is to be overcome when the device is set in motion; thus a sizable starting force is required which exerts pull or tractive stresses, the latter being necessarily absorbed by the fabric which, in turn, will be damaged, in particular in case of treating light weight fabrics having reduced tensile strength. It will be observed that the use of slide bearings for the pulleys or rollers greatly adds to the friction which, together with the inertia of the rollers, must be overcome when starting the device; hence there exists the danger of breaking or displacing the warp threads of the fabric, as a result of inherent large pulling forces.

The general object of the present invention is to provide means avoiding the above disadvantages in stretcher devices of the aforesaid type.

More particularly, the invention has for its object to provide means reducing the inertia to a minimum, easing movement and considerably diminishing the cost of maintenance of stretching devices while providing an increased and effective duration of service as compared with conventional stretchers of more expensive and complicated structure.

Another object of this invention is to provide means facilitating simplified construction of the roller or rollers and service thereof during or between operations.

A further object of the invention is to provide means enabling a rapid assembly of each stretcher carrier and convenient replacement of any part thereof that is subjected to wear.

In order to attain the above and other objects to which reference will be had, the invention contemplates means for individually mounting each roller or carrier on a curved spindle so as to allow change of angular relationship between the roller and its supporting spindle within certain limits, bearing means being provided with convex bearing surfaces for supporting each roller upon the spindle.

According to another feature of the invention, the portion of the bearing surface making contact with the spindle has a radius less than the radius of curvature of the spindle itself.

According to a further feature of the invention, the bearing means provided with convex bearing surface or surfaces is integral with or otherwise fixedly secured to the boss or hub of the roller.

According to still another feature of the invention, the bearing means provided with the convex bearing surface is impregnated with friction reducing means.

According to a still further feature of the invention, the roller consists of a porous material of relatively low weight, preferably wood, and the portion of its hub forming the bearing surface is impregnated with colloidal graphite or like substance.

The above and other features of the invention will become apparent, and the invention will be more fully understood from the following description of a specific embodiment, reference being had to the accompanying drawing in which.

Figure 1:
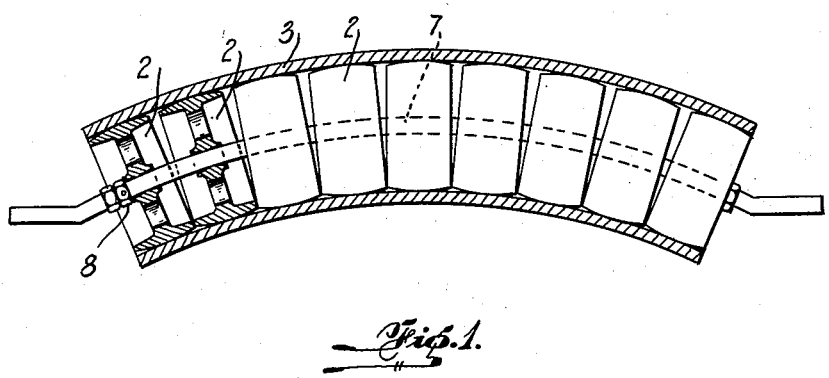
Fig. 1 shows a longitudinal cross section of a stretcher device embodying the invention.
Figures 2, 3:
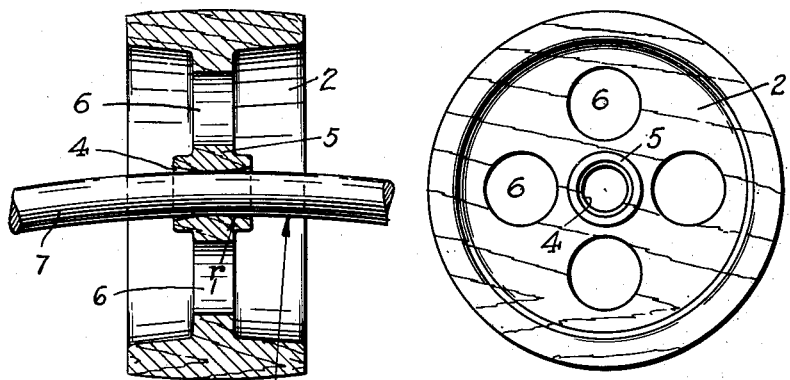
Fig. 2 is a section, similar to that of Fig. 1, of a single roller forming part of the stretcher device and drawn to a larger scale.
Fig. 3 is a side elevation of the roller of Fig. 2.

Referring now more particularly to the drawing, there is shown at 7 a metallic supporting spindle constituting a curved axis, on which are journaled a number of individual rollers 2 which are surrounded by a common sleeve 3, made of rubber or of any other suitable material.

According to an important feature of the invention, the rollers or carriers 2 are journaled on the supporting spindle or rod 7 by means of convex bearing surface or surfaces 4 extending from hub 5 of each roller. This convex surface 4 defines a suitable bore, which is curvilinear in cross-section, flaring from the middle of said bore toward the lateral ends thereof. This surface 4 has preferably a generatrix in the form of an arc of a circle whose radius $r$ is less than the inner radius of curvature $R$ of the spindle 7. Thus, the roller 2 is free to become slightly inclined relative to the supporting spindle to respond to instantaneous operative conditions.

By suitably selecting the materials for the bearing surface 4 and the supporting spindle 7, lubrication therefor may be dispensed with. Thus, it has been found that completely satisfactorily results may be obtained by using wooden hub 5 cooperating with a metallic rod. The cooperation between these parts may be further improved by impregnating the bearing surface of the hub with a friction reducing substance such as, for example, colloidal graphite.

In view of the fact that the use of a wooden hub in a device according to the invention has been found advantageous, it becomes possible to construct the entire roller of wood, which materially reduces the weight thereof. The roller may also be further reduced in weight by cutouts 6 provided in the web of said roller.

The rollers are simply slid upon the supporting rod or spindle 7, their number depending upon the width of the fabric to be treated, and are held in place by adjustable ring stop members 8, or similar retainer means disposed at the extremities of the assembled stretcher device.

It will thus be seen that the aforesaid device offers numerous advantages consistent with the objects hereinabove stated. Thus, the rollers may be made of an inexpensive material preferably, but not exclusively wood, are easy to manufacture and have a relatively small weight, which insures that the assembled stretcher system will have low inertia so that moderate forces only are required to set it in motion, whereby in turn the fabric material will not be likely subjected to any stresses.

As a result of the convex bearing surfaces, the rollers will automatically assume proper adjusted position required for the satisfactory functioning of the device, thereby avoiding any danger of jamming or disturbance. Furthermore, the particular arrangement disclosed obviates the need for lubricating the rolling surfaces. If any of the parts of the device becomes worn, it may readily be replaced, owing to the simplicity of the construction of the stretcher bar according to the invention; the low price of the rollers and small labor making replacements inexpensive.

It will also be understood that the number of rollers may be varied at will, since it is merely necessary to slide them onto the supporting spindle independently of one another.

In operation, the fabric (not shown) is fed in the usual manner to the concave (lower) side of the assembly, passing from there to the convex (upper) side so as to be thus subjected to the desired stretch and increase in width.

It will be understood that the rollers may be made, for example, of a suitable plastic material or plastic composition, and the weight of the rotating parts may be reduced to a minimum through proper dimensioning and the provision of hollows or cut-outs 6. Furthermore, a plurality of stretcher bars according to the invention may be arranged in cascade if a single bar is insufficient to produce the desired increase in the width of the fabric.

From the foregoing it will be apparent that the invention provides an improved device for stretching or widening fabrics and like pliable material which is characterized by a curved spindle, a plurality of rollers disposed on said spindle in side-by-side relation, and a plurality of bearings each rotatably supporting a respective roller on said spindle or rod, each bearing having a bore convex in cross section, whose smallest diameter is substantially equal to the diameter of the rod.

As many possible embodiments may be conceived of the above invention, and as alterations and changes may be made in the embodiments above set forth, it is to be stated that all matters hereinbefore explained or shown in the accompanying drawing are to be interpreted as illustrative and not in a limitative sense.

Having thus described the invention, what is claimed as new and desired to be secured by Letters Patent is:

1. A device for stretching fabric and like material comprising a curved spindle, and a plurality of rollers each independently rotatable on said spindle, each of said rollers including an integral hub provided with a center bore curvilinear in cross section and flaring from the middle of said bore toward the ends thereof, thereby enabling said rollers to assume inclinations at varying angles relative to said curved spindle.

2. A device according to claim 1, wherein said bore has a radius of curvature less than the radius of curvature of said spindle.

3. A device according to claim 1, wherein the smallest diameter of said bore corresponds substantially to the diameter of said spindle so as to be threaded thereon.

4. A device for stretching fabric and like material comprising a curved rod, a plurality of rollers disposed on said rod in side-by-side relation, and a plurality of bearings each forming part of and rotatably supporting a respective roller on said rod, each of said bearings being provided with a bore curvilinear in cross section and flaring from the middle of said bore toward the ends thereof to provide a bearing surface, whose smallest diameter corresponds substantially to the diameter of said rod, whereby each roller with its bearing may be threaded on said rod.

5. A device according to claim 4, wherein each of said rollers and bearings thereof forms a unitary wood structure.

6. A device according to claim 4, wherein each of said rollers is made of plastic material, said curved rod being made of metal.

JULIEN DUNGLER.

REFERENCES CITED

The following references are of record in the file of this patent:

UNITED STATES PATENTS

| Number | Name | Date |
|---|---|---|
| 1,054,265 | Baekeland | Feb. 25, 1913 |
| 1,280,460 | Heider | Oct. 1, 1918 |
| 1,719,375 | Isherwood | July 2, 1929 |
| 2,393,191 | Robertson | Jan. 15, 1946 |

FOREIGN PATENTS

| Number | Country | Date |
|---|---|---|
| 220,818 | Switzerland | Apr. 30, 1942 |